United States Patent [19]
Pearson et al.

[11] Patent Number: 5,934,642
[45] Date of Patent: Aug. 10, 1999

[54] ELECTRICALLY ACTUATED PNEUMATICALLY OPERATED VALVE ASSEMBLY

[75] Inventors: James E. Pearson, Downers Grove; Dennis DeVera, Carol Stream, both of Ill.; Christopher A. Zajac, Macomb Township, Mich.

[73] Assignee: Eaton Corporation, Cleveland, Ohio

[21] Appl. No.: 08/908,260

[22] Filed: Aug. 7, 1997

[51] Int. Cl.$^6$ ................................... F15B 13/044
[52] U.S. Cl. ............................... 251/61; 91/459
[58] Field of Search ................ 251/61; 137/625.65; 91/459

[56] References Cited

U.S. PATENT DOCUMENTS 4,205,593  6/1980  Sakakibara ................. 91/459
4,669,361  6/1987  Ito et al. ................... 91/459

*Primary Examiner*—Kevin Lee
*Attorney, Agent, or Firm*—Roger A. Johnston

[57] ABSTRACT

A butterfly water valve for a heater core has a vacuum motor attached to the water valve body with the vacuum motor connected to the butterfly valve crank. The vacuum motor housing has a well formed therein and a solenoid operated valve is quick connected in the well and is ported directly to the vacuum motor pressure chamber. The solenoid valve well communicates with a vacuum connector formed integrally with the vacuum motor housing. The vacuum motor housing is preferably formed of two shells welded together and sealing about the rim of a pressure responsive diaphragm.

16 Claims, 4 Drawing Sheets

ELECTRICALLY ACTUATED PNEUMATICALLY OPERATED VALVE ASSEMBLY

STATEMENT REGARDING FEDERALLY SPONSORED RESEARCH OR DEVELOPMENT

Not Applicable

CROSS-REFERENCE TO RELATED APPLICATIONS

Not Applicable

MICROFICHE APPENDIX

Not Applicable

BACKGROUND OF THE INVENTION

The present invention relates to fluid flow control valves and particularly valves of the type employed for control of engine coolant flow to a heat exchanger or heater core for heating air to be blown into a passenger compartment of a motor vehicle. In certain types of heater core installations in present day motor vehicles, it is desired to have the heater core valve controlled or modulated by a pneumatic motor and particularly a vacuum operated motor or actuator in order to provide for the necessary force required to maintain the valve closed in the face of the pressure developed at the outlet of the engine coolant pump.

In automotive applications where a vacuum motor has been employed to control the passenger compartment heater core valve, it has been widespread practice to employ a butterfly-type valve, inasmuch as the valve is quick acting and is very low in manufacturing cost. A butterfly valve has the property that a small amount of opening of the valve, or rotation of the butterfly plate by a few degrees from the closed position, results in an immediate major portion of full flow; and, further opening of the valve to the fully opened position results in only a minor fractional increase in the flow. Thus, a butterfly valve has been found to be particularly suitable for automotive heater core applications.

Heretofore, where a vacuum motor or actuator has been connected to the shaft of the butterfly in the heater core valve, it has been found convenient to mount the vacuum motor to the butterfly valve body; however, the vacuum modulating valve required to produce the control signal for the vacuum motor has been, remotely located in view of its size and complexity. This arrangement has resulted in additional vacuum lines routed through the vehicle fire wall inasmuch as the vacuum source is typically the engine inlet manifold depression.

In many motor vehicle installations and particularly passenger and light truck vehicles, the passenger compartment climate control system including the heater core and optionally the air conditioning system evaporator is contained in a housing mounted to the vehicle engine compartment fire wall. Thus, in order to facilitate vehicle assembly, it has been desired to have the climate control system including actuators assembled as a complete unit prior to installation in the vehicle. Such an arrangement is desired in that it eliminates the need for separately mounting accessories and sensors for the system at other locations on the vehicle body and thus necessitating interconnection therebetween.

Presently, the trend has been more towards complete electrical or electronic control of passenger vehicle climate control systems in order to utilize the control capabilities of microprocessors or microcomputers. Thus, it has been desired to provide a way or means of electrically controlling a vacuum motor or actuator for the heater core water valve. In particular it has been desired to provide a compact reduced size heater core water valve which is electrically controlled yet which retains the actuating force of a vacuum motor or actuator to provide for positive closing of the water valve.

BRIEF SUMMARY OF THE INVENTION

It is an object of the present invention to provide a reduced size or compact water valve, particularly suited for automotive heater core applications, which is vacuum or pneumatically operated and electrically controlled and which is simple to manufacture and low in cost.

It is a further object of the present invention to provide a compact, low cost automotive heater valve which is pneumatically operated by a fluid pressure control signal generated by an electrically operated valve which is mounted in a common housing with the pneumatic motor actuator.

The present invention provides a vacuum actuated heater core water valve with the vacuum actuation pressure controlled by a solenoid operated valve mounted together on a common housing with the vacuum actuator which is attached to the water valve body.

The solenoid operated valve of the present invention is attached as a plug-in or drop-in unit to the housing of the vacuum actuator which is attached to the water valve body; and, the actuator is connected to operate the shaft of the butterfly member in the water valve. The vacuum actuator is preferably formed of two housing shells with the mounting bracket integrally formed with one shell and the signal port for the pneumatic actuator and vacuum line connector integrally formed with the other shell for receiving in the solenoid valve in plug-in connection. The shells are joined together along a parting line which seals about the periphery of a pressure responsive diaphragm which is operatively connected via an actuator member to the shaft for controlling the butterfly valve.

The present invention thus provides a low cost compact solenoid operated pneumatic or vacuum actuator motor mounted as a unit on a butterfly water valve for providing electrical control of water flow through the butterfly valve and is particularly suitable for automotive heater core applications.

DETAILED DESCRIPTION OF THE INVENTION

Figure 1:
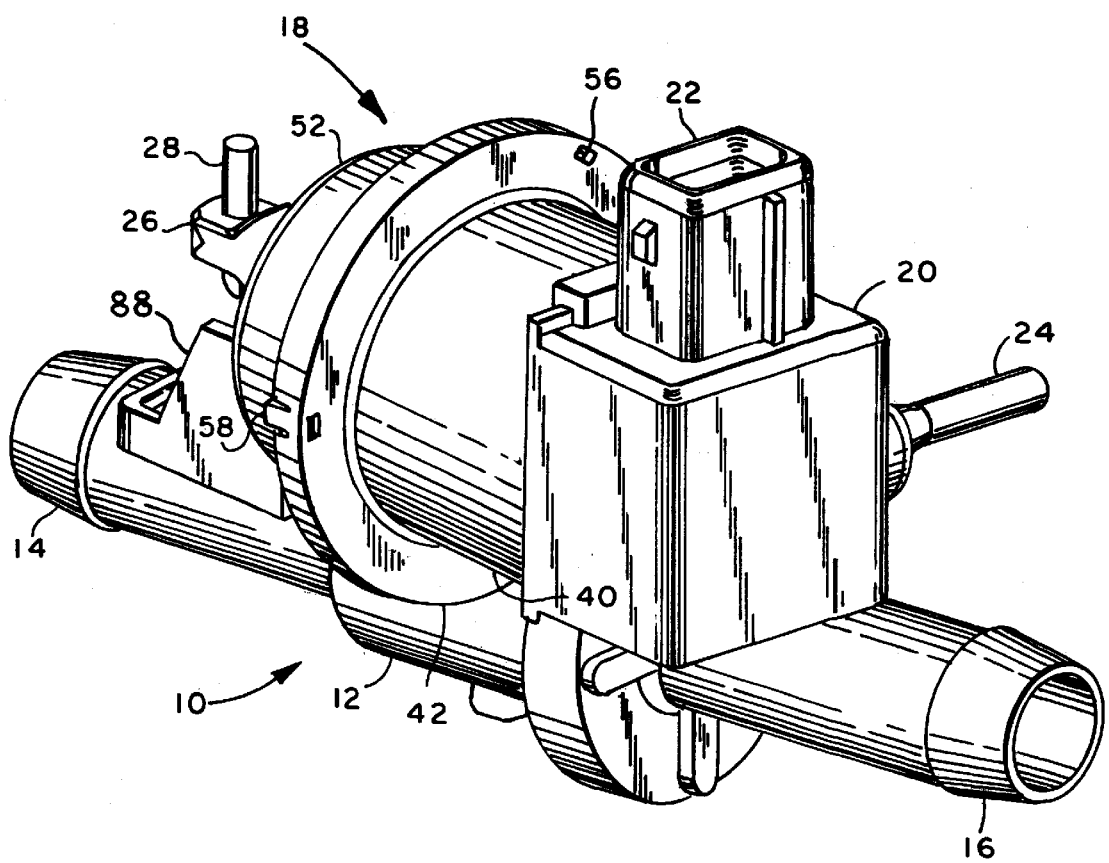
FIG. 1 is an axonometric view of the assembly of the present invention.
Figure 2:
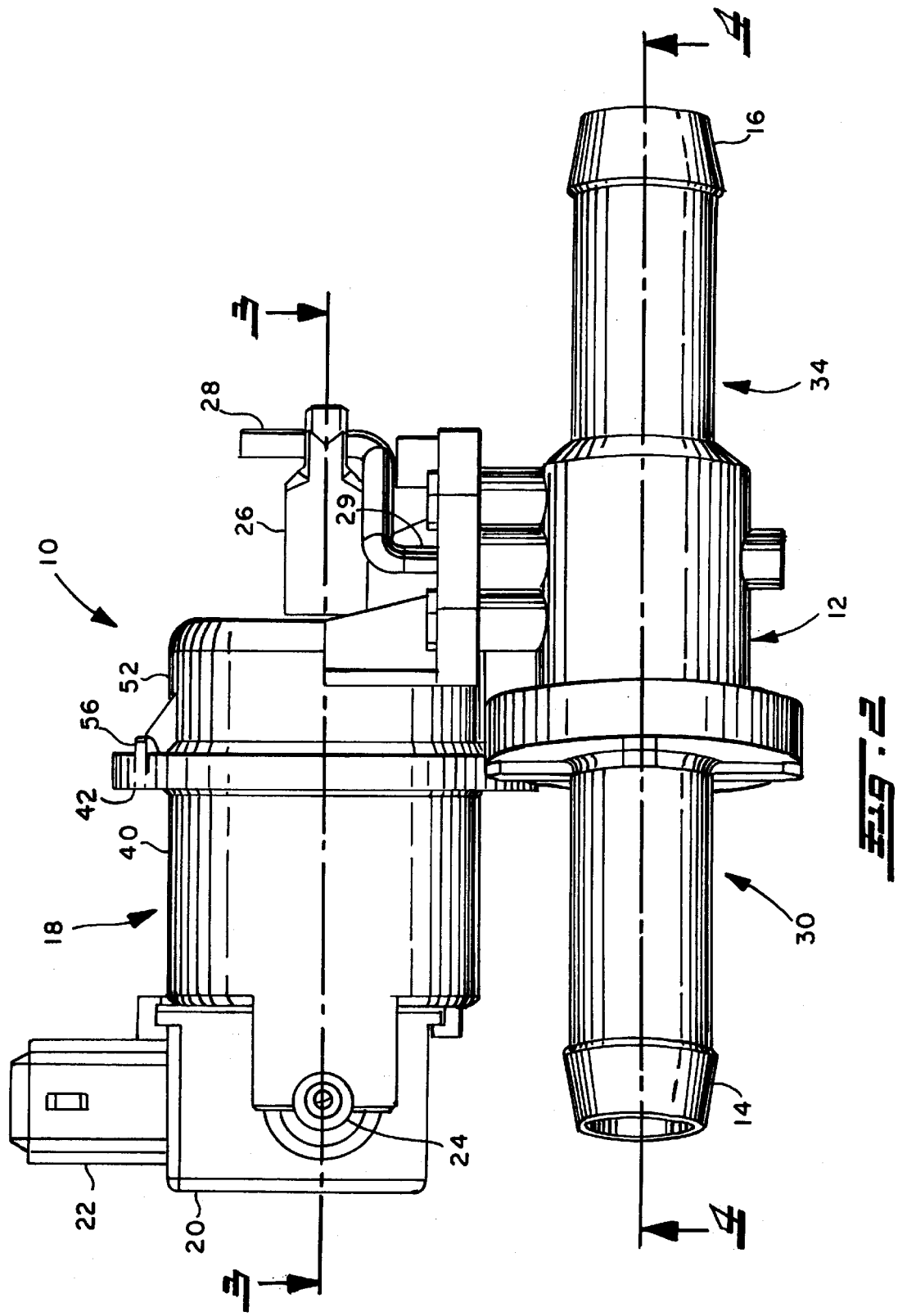
FIG. 2 is a side elevation view of the assembly of FIG. 1.

Referring to FIGS. 1 and 2, the assembly of the present invention is indicated generally at 10 and includes a water valve body 12 having an inlet connector 14 and an outlet connector 16 with a pneumatic actuator housing indicated generally at 18 and a solenoid valve cover 20 having thereon an electrical connector receptacle 22 adapted for connection to a wiring harness connector (not shown). The pneumatic actuator housing 18 includes a fluid pressure signal connector 24 which is integrally formed therewith as will hereinafter be described. The pneumatic actuator 18 includes an externally extending actuator member 26 which is operatively connected to a crank 28 forming a part of a valve shaft extending within the valve body 12.

Figure 4:
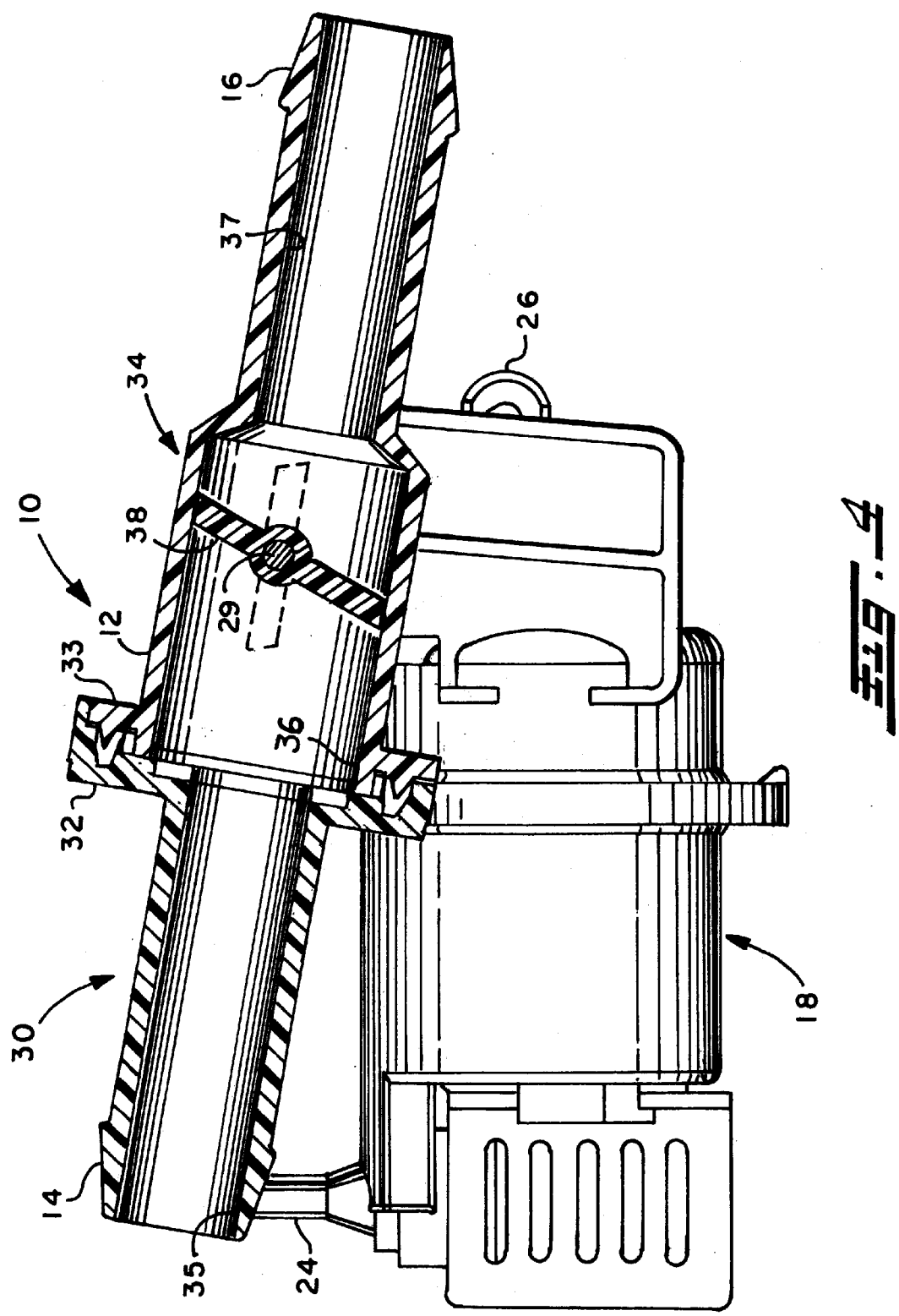

Referring to FIG. 4, the valve body 12 is preferably formed in two pieces, one piece indicated generally at 30 having a flange 32 formed about the connector 14 which has an inlet passage 35 therein. A second piece indicated generally at 34 defines therein a valving chamber 36 connected to outlet passage 37 in outlet connector 16, with a butterfly valving member 38 disposed within the chamber 36 and pivoted about the shaft 29 which is connected to crank 28. The second piece 34 also has a flange 33 formed thereon about chamber 36. The flanges 32, 33 are secured and sealed together by an convenient expedient as, for example, friction spin welding or sonic welding to form the valve body 12.

Figure 3:
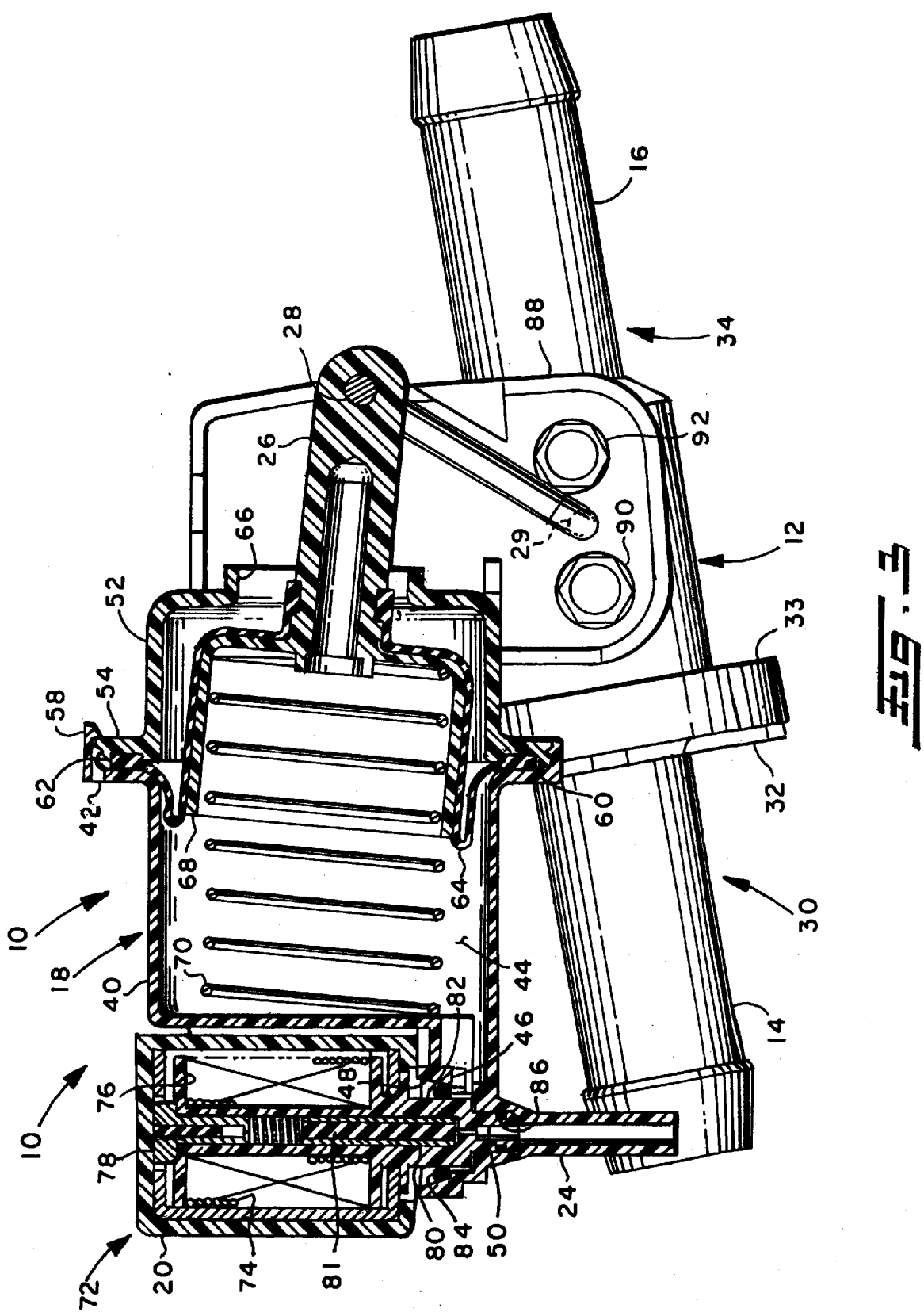
FIG. 3 is a section view taken along section-indicating lines 3—3 of FIG. 2; and, FIG. 4 is a section view taken along section-indicating lines 4—4 of FIG. 2.

Referring to FIG. 3, the actuator housing 18 is partially formed by a first shell 40 a valving chamber 44 formed therein and having a flange 42 integrally formed thereon at one end thereof with the fluid pressure signal connector 24 formed on the end thereof opposite flange 42. The end of the shell 40 adjacent connector 24 has formed therein a fluid pressure signal port 46 which opens into a well 48 formed thereabout and integrally with shell 40. Well 48 has formed therein a passage 50 which extends through to the exterior of the connector 24 for receiving therein a fluid pressure signal from a fluid pressure supply (not shown).

Housing 18 is completed by a second shell 52 with a flange 54 formed thereabout and which is joined with flange 42 about a parting line and secured thereon by a plurality of circumferentially spaced snap tabs 56, 58 (see FIG. 1), only one of which denoted by reference numeral 58 is illustrated in FIG. 3. The shell flange 54 has formed therein a circumferential or annular groove 60 which has received therein in sealing engagement a peripheral bead ring 62 which is formed about the periphery of a pressure responsive member comprising a flexible diaphragm 64 which is thus disposed in the chamber 44 which is closed by the shell 52.

Diaphragm 64 has a backing or stiffening cup 68 received therein and which has formed preferably integrally therewith the actuator member 26 which extends outwardly of the housing 18 through aperture 66.

A bias spring 70 is disposed in the chamber 44 and has one end registered against the interior of the cup 68 and the opposite end registered against the wall of housing shell 40 and serves to bias the diaphragm cup and actuator member 26 in a rightward direction or in a direction to oppose the forces on diaphragm 64 created by a negative gauge pressure or vacuum in chamber 44. In the present practice of the invention, the valve assembly 10 is arranged such that a negative gauge pressure or vacuum in chamber 44 moves the crank 28 and butterfly shaft 29 in a counter-clockwise direction to open the butterfly valve 38.

Referring to FIG. 3, a solenoid valve assembly indicated generally at 72 includes a coil 74 formed about a bobbin 76 which has centrally disposed therewithin a stationary armature or pole piece 78. A moveable armature 80 which has a hollow tubular configuration and which has provided centrally therewithin a resilient core which has the end thereof seating over the end of passage 50 for valving flow therethrough is slidably disposed in bobbin 76. The bobbin 76 has formed integrally therewith a valve body portion 82 which is configured to engage in plug-in arrangement the well 48 and is sealed therein by seal rings 84, 86.

In operation, upon application of an electrical current to the coil 74 via electrical connectors (not shown) but it will be understood are disposed in receptacle 22, the armature 80 is magnetically raised such that the resilient core 81 thereof opens the passage 50 to admit the fluid pressure signal through port 46 via passage 85 in valve body 82 thereby creating a lower pressure in chamber 44 and causing actuator 26 to move valve crank 28 and shaft 29. As shown in FIG. 3, the valve body portion 82 is received in well 48 in plug-in connection in the direction of movement of the moveable armature 80.

The present invention thus provides for a drop-in or plug-in connection of the solenoid operated valve 72 to the housing shell 40 to connect the valve ports of valve 72 directly to integrally formed connector 24 and port 46 for supplying the fluid pressure signal to the chamber 44 by operation of the electric valve 72.

The shell 52 of pneumatic actuator 18 has preferably integrally formed therewith a mounting bracket 88 which is attached to the valve body by suitable fasteners such as the screws 90, 92.

The present invention thus provides a unique low cost and compact assembly of a butterfly water valve with a pneumatic vacuum actuator and electric control valve for controlling the pneumatic actuator. The assembly of the present invention is particularly suited for controlling flow of engine coolant to an automotive heat exchanger or heater core.

Although the present invention has been described hereinabove with respect to the illustrated embodiments, it will be understood that the invention is capable of modification and variation and is limited only by the scope of the following claims.

We claim:

1. An electrically actuated pneumatically operated valve assembly comprising:

(a) a first body for defining a valving chamber communicating with an inlet flow passage and an outlet flow passage;

(b) a valving member disposed in said chamber and operable for movement between an open and closed position for controlling flow between said inlet passage and said outlet passage;

(c) a housing associated with said first body and defining a fluid pressure sealed cavity and including a pressure responsive member operably connected for effecting said movement of said valving member in response to controlled pressure changes in said cavity; said housing defining a fluid pressure port in said cavity and a fluid pressure signal connector adapted for connection to a source of fluid pressure;

(d) an electrically operated valve having a moveable armature and a second body with a first port communicating with said pressure signal connector and a second port communicating with said cavity pressure port, wherein said electrically operated valve has a portion of said second body received in plug-in connection with said first body in the direction of movement of said armature, said valve operable upon connection of said pressure signal connector to a source of air pressure and selective electrical energization to control flow between said first and second port and the pressure in said cavity.

2. The valve assembly defined in claim 1, wherein said valving member comprises a butterfly plate.

3. The valve assembly defined in claim 1, wherein said housing includes a first shell with said body means attached thereto and a second shell forming said fluid pressure port and said fluid pressure signal connector said first and second shell joined along a parting line and forming said cavity therebetween.

4. The valve assembly defined in claim 1, wherein said housing includes a first and second shell joined along a parting line and cooperating to form said cavity, wherein said pressure responsive member comprises a diaphragm sealed between said first and second shell.

5. The valve assembly defined in claim 1, wherein said housing includes a first and second shell joined along a parting line and cooperating to form said cavity, wherein one of said shells includes a mounting bracket for said valve assembly integrally formed therewith as one piece.

6. The valve assembly defined in claim 1, wherein said electrically operated valve comprises a solenoid operated valve.

7. The valve assembly defined in claim 1, wherein said housing is releasably fastened to said first body.

8. A method of making an electrically actuated, pneumatically operated valve assembly comprising:

(a) disposing a first moveable valve member in a first valve body;

(b) forming an actuator housing having a fluid pressure chamber with a fluid pressure port and a fluid pressure supply connector and disposing a pressure responsive member in said chamber and connecting said pressure responsive member to said valve member and moving the valve member;

(c) providing an electrically operated valve having a second body and a moveable armature and plug-in connecting a portion of said second body in said first body in the direction of movement of said armature between said supply connector and said port and electrically energizing the electrically operated valve and controlling flow between said connector and said port and varying the pressure in said pressure chamber and moving said first valve member.

9. The method defined in claim 8, wherein said step of forming an actuator housing includes molding plastic material.

10. The method defined in claim 8, wherein said step of forming an actuator housing includes integrally forming said fluid pressure chamber and said fluid pressure connector as one piece.

11. The method defined in claim 8, wherein said step of connecting includes integrally forming a bracket on said actuator housing and attaching said bracket to said valve body.

12. The method defined in claim 8, wherein said step of connecting includes disposing an actuator member with said pressure responsive member and extending said actuator member externally of said housing.

13. The method defined in claim 8, wherein said step of disposing a pressure responsive member includes disposing a spring in said chamber and biasing said pressure responsive member in one of said open and closed positions.

14. The method defined in claim 8, wherein said step of electrically energizing includes electromagnetically moving an armature.

15. The method defined in claim 8, wherein said step of forming an actuator housing includes forming a first and second shell and joining said shells about a parting line.

16. The method defined in claim 8, wherein said step of forming an actuator housing includes forming a first and second shell and integrally forming an attachment bracket with one of said shells.

* * * * *